(No Model.)  2 Sheets—Sheet 1.
J. G. ALEXANDER.
GUIDING DEVICE FOR VEHICLES.
No. 557,471. Patented Mar. 31, 1896.
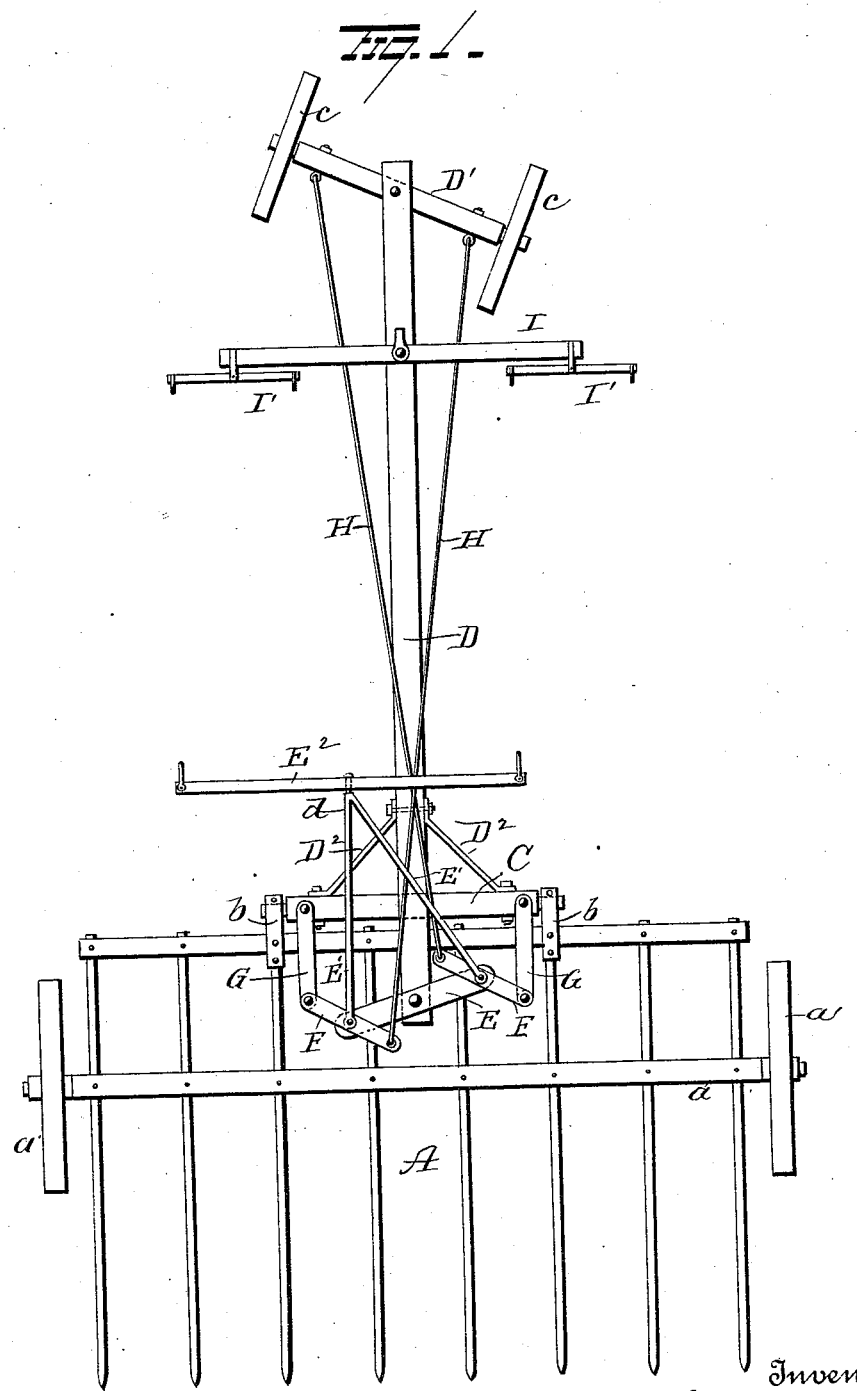

(No Model.) 2 Sheets—Sheet 2.
J. G. ALEXANDER.
GUIDING DEVICE FOR VEHICLES.
No. 557,471. Patented Mar. 31, 1896.
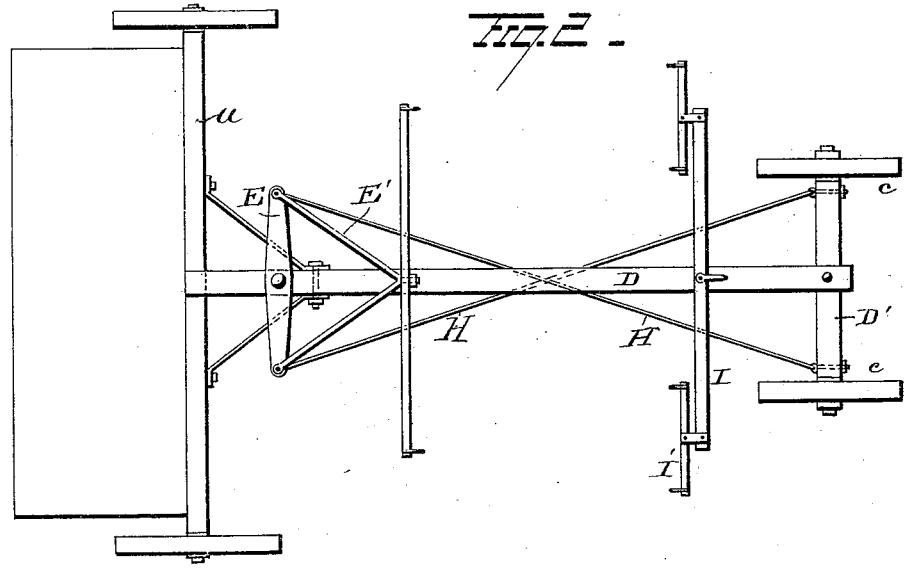
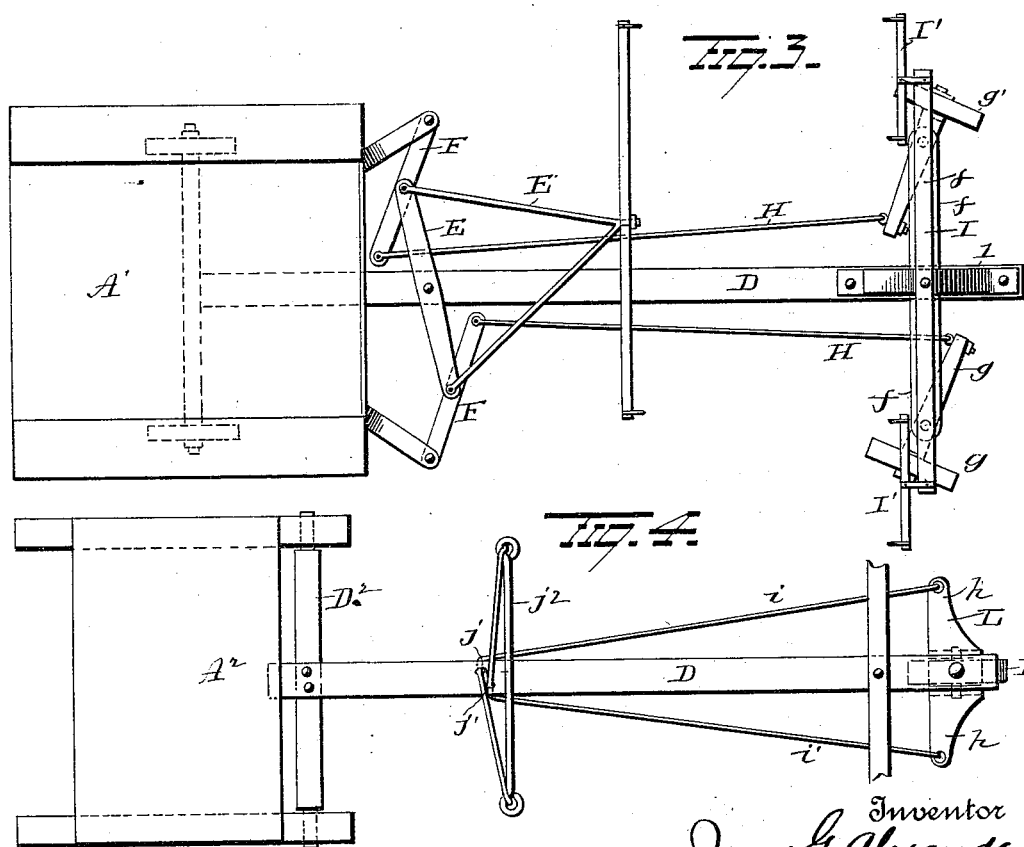
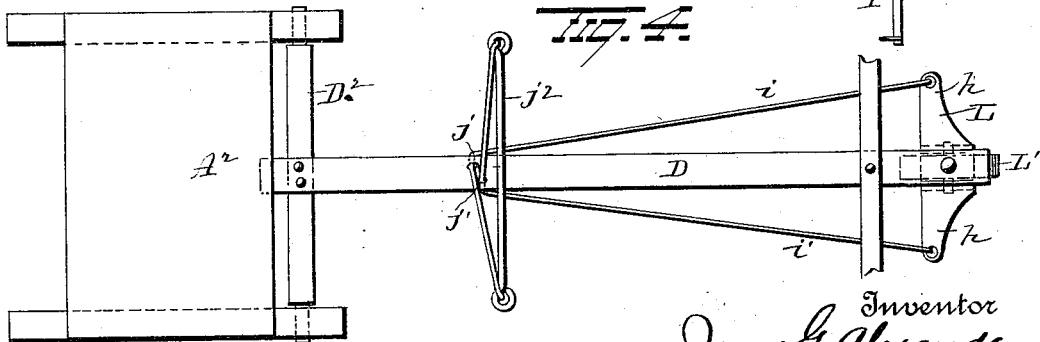
Witnesses
E. Nottingham
G. F. Downing
Inventor
James G. Alexander
By H. A. Seymour
Attorney

UNITED STATES PATENT OFFICE.

JAMES GREEN ALEXANDER, OF FAIRFIELD, IOWA.

GUIDING DEVICE FOR VEHICLES.

SPECIFICATION forming part of Letters Patent No. 557,471, dated March 31, 1896.

Application filed November 2, 1893. Serial No. 489,859. (No model.)

*To all whom it may concern:*

Be it known that I, JAMES GREEN ALEXANDER, of Fairfield, in the county of Jefferson and State of Iowa, have invented certain new and useful Improvements in Guiding Devices for Vehicles; and I do hereby declare the following to be a full, clear, and exact description of the invention, such as will enable others skilled in the art to which it appertains to make and use the same.

My invention relates to an improvement in guiding devices for vehicles, the invention being particularly adaptable for use in connection with vehicles—such as carts, hay-rakes, harvesters, &c.—where the team is located in rear of the same.

Heretofore it has been the practice in the construction of hay-rakes and other vehicles in which the draft-animals are located in rear of the vehicle to provide manually-operative means for guiding the device. With such construction and arrangement of guiding devices it was necessary for the driver to guide the apparatus by the manipulation of either a hand or a foot lever, thus requiring care and attention of the driver which should more properly be devoted to other things.

It is the object of my invention to obviate the necessity of guiding the vehicle of the class described by devices to be manipulated by the driver, and to provide simple and efficient means whereby the apparatus can be properly guided by the draft-animals.

A further object is to provide a vehicle having a pole incapable of lateral movement independent of the vehicle, with guiding devices constructed and arranged in such manner as to be automatically operated by the draft-animals.

A further object is to provide a vehicle having a rearwardly-extending pole incapable of lateral movement independently of the vehicle, and means connected to said pole for the attachment of draft-animals rearwardly of the vehicle, and with devices so constructed and arranged that the guiding of the vehicle will be effected by the lateral movements of the draft-animals.

With these objects in view the invention consists in the combination, with a vehicle and means for attaching draft-animals rearwardly thereof, of a guiding-wheel and extraneous devices interposed between said guiding-wheel and the draft-animals, whereby the lateral movements of said draft-animals will guide the vehicle.

The invention also consists in the combination, with a vehicle, a pole extending rearwardly therefrom and incapable of a lateral movement independently thereof, a guide-wheel having a pivotal connection with said pole, and means for attaching draft-animals to the pole, of rods connecting said pivotally-supported wheel with the draft-animals, whereby the lateral movement of said draft-animals will effect the guidance of the vehicle.

The invention also consists in certain novel features of construction and combinations and arrangements of parts, as hereinafter set forth, and pointed out in the claims.

In the accompanying drawings, Figure 1 is a plan view illustrating the preferred form of my invention. Figs. 2, 3, and 4 are views illustrating modifications.

In Fig. 1 of the drawings I have illustrated the invention applied to a hay-rake A; but it is evident that it is also applicable to other forms of vehicles—for instance, to a cart A', as shown in Fig. 3, or to a sled A², as shown in Fig. 4.

The details of construction of the rake A, so far as the present invention is concerned, is immaterial, the axle $a$ carried by the rake constituting, in effect, the front axle of the vehicle, and on this axle the usual wheels $a'$ are located.

To the head of the rake, brackets $b\ b$ are secured, in which the ends of a roller or oscillatory bar C are mounted. A tongue or pole D is secured rigidly to this roller or oscillatory bar, and from its connection with said roller or bar the tongue or pole preferably projects forwardly a short distance over the rake-head and extends rearwardly a considerable distance and at its rear end is supported on an axle D' pivotally connected thereto, said axle having guiding-wheels $c\ c$ at its ends. The rigidity of the connection of the tongue D with the bar C is also insured by means of braces D². From this construction and arrangement of parts it will be seen that the rake will have a vertical movement sufficient to permit it to properly ride over rough ground, but that so far as any lateral movement of said pole is concerned it is in effect rigidly connected to the rake or vehicle A.

Pivotally connected at a point between its ends to the forward end of the tongue or pole D is a bar E, to the ends of which a V-shaped frame or arm E' is pivotally connected, the apex $d$ of said V-shaped arm or frame being connected to a neck-yoke $E^2$, which latter is connected to the harness of the draft-animals in the usual manner.

To the ends of the pivoted bar E auxiliary bars F are pivotally connected at points between their ends. Compensating bars or links G are pivotally connected at one end to the outer ends of the auxiliary bars F and at their other ends to the bar or roller C. To the inner ends of the bars F guiding-rods H are attached, said rods being crossed, as shown in Fig. 1, and attached at their rear ends to the pivoted axle D' in proximity to the ends of the latter. At a point in advance of the axle D' a doubletree I is connected to the pole or tongue D, and at the ends of the doubletree singletrees I' are attached. From this construction and arrangement of parts it will be seen that when the team moves laterally in one direction or the other the neck-yoke $E^2$ will be moved in that direction, carrying with it the apex of the V-shaped frame or arm E', thus causing the bar E, to which said V-shaped arm or frame is attached, to turn on its pivot. As the bar E turns, the inner ends of one of the bars F connected thereto will be made to move forwardly and the inner end of the other bar F will move rearwardly. The inner ends of the auxiliary bars F being connected with the pivoted axle D' by the crossed rods H H, when the movements above described take place said pivoted axle will be turned, thus guiding the vehicle to an extent commensurate with the lateral movement of the team. Thus it will be seen that the guiding of the vehicle will be entirely controlled by the team, and the use of any devices to be manipulated by the driver will be dispensed with. By attaching the forward ends of the rods H to the inner ends of the auxiliary bars F said rods will be brought close to the pole out of the way of the team.

In the form of the invention shown in Fig. 2 the forward end of the pole D is rigidly secured to the front axle of the vehicle, or it may be secured to the vehicle-body in any suitable manner, and is properly braced by means of braces $e$ secured thereto and to the front axle. In this form of the invention the bars F and G are dispensed with and the guiding-rods H are attached to the ends of the bar E.

In the form of the invention shown in Fig. 3 the forward end of the tongue or pole D is rigidly secured to the vehicle A', and at its rear end two parallel bars $f f$ are secured between their ends thereto. Between the ends of the bars $f f$ stub-axles $g g$ are pivotally supported, and on the outer ends of said stub-axles wheels $g'$ are located. To the inner ends of the stub-axles the guide-rods H are connected, the forward ends of the guide-rods being attached to the inner ends of the bars F, the same as shown in Fig. 1, only the rods are not crossed. In the form shown in Fig. 3 the bar E is pivoted to the pole rearwardly of the vehicle-body, and the bars G are connected to the vehicle-body instead of to an oscillatory bar rearwardly of the vehicle, and the V-shaped frame E' is connected with the neck-yoke and bar E, the same as shown in Fig. 1.

In Fig. 3 the whiffletree is shown pivoted to a bracket $l$ at the rear end of the tongue or pole D.

In the form of the invention shown in Fig. 4 the pole D is made rigid with an oscillatory roller $D^2$ connected to the vehicle, and at the rear end of said pole a bracket L is pivotally connected, said bracket being adapted to support a caster-wheel L', and to the ends of arms $h$ projecting laterally from the bracket L cords or chains $i\ i'$ are respectively attached. The cords or chains $i\ i'$ are passed through diagonal perforations $j\ j'$ made in the pole or tongue in proximity to its forward end, and at their forward ends said cords or chains are attached to the ends of a neck-yoke $j^2$, the cords or chains being thus made to cross where they pass through the pole. The team may be hitched to the pole in this form of the invention the same as shown in Figs. 1 or 2.

My improvements are very simple in construction, will operate automatically to guide the vehicle when the team moves laterally, and are effectual in every respect in the performance of their functions.

Various slight changes other than those above described might be made in the details of construction of my invention without departing from the spirit thereof or limiting its scope, and hence I do not wish to limit myself to the precise details of construction herein set forth; but, Having fully described my invention, what I claim as new, and desire to secure by Letters Patent, is—

1. The combination with a vehicle, and pole extending rearwardly therefrom, of a pivoted truck at the rear end of said pole, a pivoted bar at the forward end of the pole, a rod extending forward from the truck to the forward end of the pole, means for connecting the rod to the pivoted bar, and means connected with the pivoted bar for connecting the latter to the team, substantially as set forth.

2. The combination with a vehicle and a pole extending rearwardly therefrom, of a pivoted truck at the rear end of said pole, a pivoted bar at the forward end of said pole, rods connecting said pivoted bar and pivoted truck, and an arm projecting rearwardly from said pivoted bar and adapted to be connected with the harness of the team, substantially as set forth.

3. The combination with a vehicle, and a pole extending rearwardly therefrom, of an axle pivotally connected to the rear end of said pole and supported at the ends in suitable wheels, a bar pivoted at the forward end of the pole, rods extending forward from the axle, means for connecting these rods to the axle and to the pivoted bar, and means for connecting said bar with the harness of the team, substantially as set forth.

4. The combination with a vehicle and a pole extending rearwardly therefrom, of an axle pivoted at the rear end of the pole, wheels on said axle, a bar pivoted at the forward end of the pole, auxiliary bars pivoted between their ends to the ends of said pivoted bar means for connecting them with the rear axle, compensating links and means for connecting said pivoted bars with the harness of the team, substantially as set forth.

5. The combination with a vehicle, and a pole extending rearwardly therefrom, of an axle pivoted at the rear end of said pole, wheels on said axle, a bar pivoted to the forward end of the pole, auxiliary bars pivoted between their ends to the ends of said pivoted bar, rods connected to the inner ends of said auxiliary bars and to the pivoted axle, compensating links connected to the outer ends of said auxiliary bars, and means for connecting said pivoted bar to the harness of the team, substantially as set forth.

6. The combination with a vehicle, of an oscillatory bar mounted on the rear end thereof, a pole secured to said oscillatory bar, a pivoted bar at one end of said pole and a pivoted axle at the other end, wheels on said axle, crossed rods connecting said pivoted bar and pivoted axle, and means for connecting said pivoted bar with the harness of the team, substantially as set forth.

7. The combination with a vehicle, of an oscillatory bar mounted at the rear thereof, a pole secured to said oscillatory bar, braces extending from said bar to the pole, a pivoted axle at the rear end of said pole, wheels mounted on said axle, a pivoted bar at the forward end of the pole, a V-shaped arm projecting rearwardly from said pivoted bar, a neck-yoke connected to said V-shaped arm, and rods connecting said pivoted bar and pivoted axle, substantially as set forth.

In testimony whereof I have signed this specification in the presence of two subscribing witnesses.

JAMES GREEN ALEXANDER.

Witnesses:
CHAS. D. FULLER,
G. A. WELLS.